Oct. 3, 1967
B. J. ALDENHOFF
3,345,552
THREE PHASE HALF WAVE DIRECT CURRENT POWER SOURCE
Filed March 29, 1965
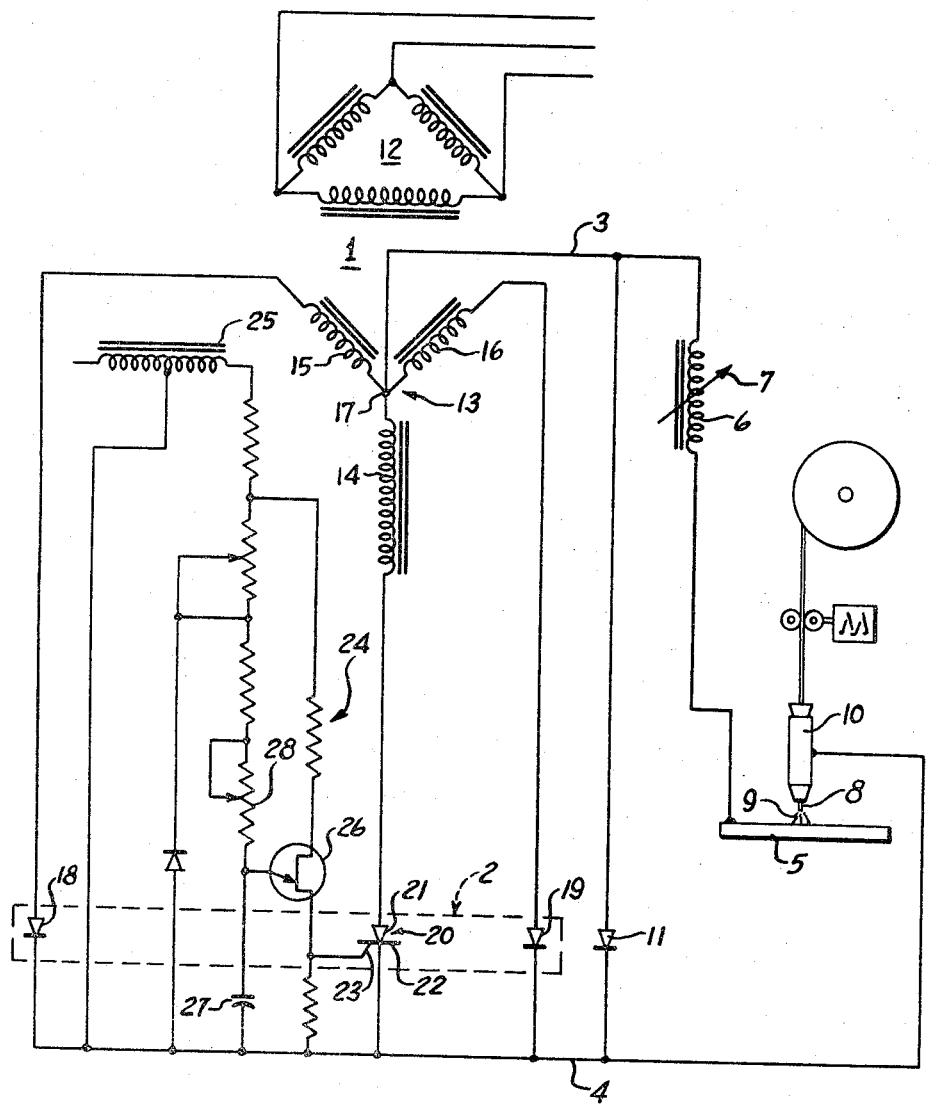
INVENTOR.
BERNARD J. ALDENHOFF 3,345,552
THREE PHASE HALF WAVE DIRECT CURRENT POWER SOURCE
Bernard J. Aldenhoff, Oconomowoc, Wis., assignor, by mesne assignments, to Harnischfeger Corporation, West Milwaukee, Wis., a corporation of Wisconsin
Filed Mar. 29, 1965, Ser. No. 443,502
3 Claims. (Cl. 321—5)

ABSTRACT OF THE DISCLOSURE

A three phase transformer includes a star connected secondary having the common terminal connected to an output lead and the opposite ends of the three windings specially connected to a second output lead in series with an adjustable inductance and a welding arc. Of the three secondary windings, two are similarly wound to provide a selected relatively low voltage. The two low voltage windings are solely connected to the output leads by uncontrollable diode rectifiers. The third winding is wound to produce a voltage twice the voltage of each separate low voltage winding. The high voltage winding is connected to the output lead in series with a silicon controlled rectifier which is fired from a unijunction pulse forming circuit. By controlled firing of the controlled rectifier, the arc voltage is varied between the voltage of the low voltage windings and the high voltage winding.

---

This invention relates to a three phase half wave rectified circuit and particularly to providing a low cost unit having a limited output voltage adjustment.

Direct current (D.C.) is widely employed in the control and processing field. The D.C. power supply has for example been widely employed in arc welding machines wherein a welding arc is established between a work member and an electrode, which may be either consumable or nonconsumable. In many applications, only a relatively limited voltage adjustment is required and the present invention is particularly directed to a D.C. power supply having a relatively low cost control of the output voltage for arc welding, motor controls and other electrical applications.

In accordance with the present invention, the power supply includes a three phase transformer wound to provide a suitable reduced output voltage. A half wave rectifying bank is provided interconnecting the secondary in a half wave output circuit between a pair of D.C. output leads. For arc welding and the like, a stabilizing inductance means is connected in series with one of the output leads. In accordance with the present invention, one of the three phase legs or windings of the secondary is connected in circuit through a silicon controlled rectifier or a similar controlled device to adjust the portion of the voltage wave applied across the D.C. output leads and thus across the arc or other load. Uncontrolled rectifiers or diode means are connected in the other legs to complete the half wave rectification of the three phase power supply. The leg including the controlled rectifier is wound with a relatively substantially greater number of turns and produces a greater peak output voltage than the other two legs; for example, twice the voltage of each of the uncontrolled legs. In operation, the average output voltage applied to the load may be adjusted between a minimum voltage created by the two uncontrolled legs and the maximum provided by all three legs through selective firing of the silicon controlled rectifier and the resulting adjustment of the proportion of the voltage wave of the controlled leg impressed on the load.

Generally, a timing circuit such as a known unijunction transistor circuit or the like is phased with the controlled leg and rectifier and connected to the controlled rectifier to provide a selected timed firing thereof. The timing circuit includes an adjustable means for adjusting the firing point of the controlled rectifier and thereby the rectified output of that leg.

It has been found that this structure provides a highly satisfactory D.C. power supply where a limited voltage adjustment is required. For example, a 200 ampere welding machine with a voltage adjustment between 30 and 17 volts has been constructed in accordance with the teachings of the present invention.

The drawing furnished herewith illustrates a preferred construction of the present invention clearly disclosing the above features and advantages as well as others which will be clear to those skilled in the art.

The drawing is a schematic circuit of a welding system employing a D.C. power supply constructed in accordance with the present invention.

Referring to the drawing, a three phase transformer 1 has its output connected through a rectifier bank 2 to a pair of welding leads 3 and 4. A work member 5 is connected to the lead 3 in series with an adjustable stabilizing inductor 6. The adjustable feature is diagrammatically shown by the arrow 7. A consumable electrode 8 is continuously fed toward the work 5 and consumed by the welding arc 9. The electrode 8 is connected to the lead 4 and therefore to rectifier bank 2 through a suitable head 10 to complete the welding circuit. In accordance with the teaching of a copending application of the applicant and another inventor entitled Arc Power Supply filed on Apr. 7, 1964 with Ser. No. 357,936, a stabilizing diode 11 is preferably connected in parallel with the series connection of the inductance 6, the work 5 and the electrode 8.

In the illustrated embodiment of the invention, the three phase transformer 1 includes a delta connected primary 12 interconnected to a suitable source of three phase power such as the usual power distribution system. A star connected secondary 13 includes the windings 14, 15 and 16 magnetically coupled to the corresponding windings of the delta primary 12 with the star or common point 17 interconnecting corresponding ends of the windings 14–16. The outer ends of the windings 14–16 are connected through the rectifier bank 2 to the lead 4. The winding 14 is wound with double the number of turns of either winding 15 or 16 to produce an output voltage peak twice that of either of the other windings for reasons more fully developed hereinafter.

The rectifier bank 2 includes a pair of diode rectifiers 18 and 19 which interconnect the free ends of windings 15 and 16 to the lead 4. The diodes 18 and 19 are polarized in a similar direction to provide a direct current with respect to the electrode 8. A silicon controlled rectifier 20 interconnects the high voltage winding 14 to the electrode lead 4 and is polarized in a similar manner to provide for a controlled voltage application to the electrode 8. The silicon controlled rectifier 20 is diagrammatically illustrated including the anode 21 connected to the winding 14 and a cathode 22 connected to the lead 4. The conduction through the rectifier 20 is controlled by proper application of a signal to a gate 23 when the anode 21 is positive with respect to the cathode 22 in accordance with known theories of operation of silicon controlled rectifiers.

Firing or turning on of the rectifier 20 is controlled in the illustrated embodiment of the invention by a generally known timing circuit 24 having an input control transformer 25 providing a source of power. The control transformer 25 is phase related to the winding 14 to provide pulses to the silicon controlled rectifier 20 in timed relation to the voltage wave of winding 14 and particularly during each period of the alternating current wave that the anode 21 is positive with respect to cathode 22. Generally, the timing circuit 24 includes a unijunction transistor 26 connected in a typical triggering circuit with a capacitor 27 and a control potentiometer 28. Adjustment of the potentiometer 28 controls or adjusts the time constant of the potentiometer 28 and the capacitor 27 and thereby control the time that the unijunction transistor 26 is fired. This in turn will control the time at which the capacitor 27 discharges through the gate to cathode circuit of the silicon controlled rectifier 20 and thereby control the firing of the silicon controlled rectifier 20 with respect to the positive voltage half cycle of winding 14. The silicon controlled rectifier 20 can therefore be caused to fire any time during the complete half cycle that the anode 21 is positive with respect to the cathode 22. In this manner, the portion of this half cycle applied across the electrode 8 and the work 5 is controlled and the total average voltage and therefore power supplied to establish and maintain the arc 9 is closely controlled between the minimum voltage established when the rectifier 20 is not fired and the voltage is solely established by the windings 15 and 16 and the maximum voltage established when rectifier 20 is fully fired and the voltage is established by all three windings 14–16.

The stabilizing inductance 6 and diode 11 smooth the chopped wave shape and maintain a reasonably steady direct current suitable for various welding applications.

An economical welder has been constructed in accordance with the circuit shown. The machine was a 200 ampere output machine having a 60% duty cycle with a three phase input. The output voltage was adjustable between 17 and 30 volts. The machine was designed to provide the desired 30 volts output with the rectifier 20 fired to provide full application of the corresponding half wave from the high voltage winding 14. The voltage was reduced by successively reducing the firing point of the silicon controlled rectifier 20 and thereby reducing the proportion of that voltage half cycle applied to the load. Minimum voltage of 17 volts was obtained when the rectifier 20 was timed to fire essentially at the very end of its half cycle and in essence when the high voltage winding appeared as an open circuit.

The circuit was found to provide a suitable direct current power supply where only a limited voltage adjustment is required. The circuit is reliable and provides a simple means for continuous adjustment over the limited range and minimum cost is of substantial significance.

Various modes of carrying out the invention are contemplated as being within the scope of the following claims particularly pointing out and distinctly claiming the subject matter which is regarded as the invention.

I claim:
1. In a three phase half wave direct current power source,
  a three phase transformer having a three phase secondary having three phase windings,
  a pair of uncontrolled rectifier means each being connected between a different one of two of the windings and an output lead, said rectifier means constituting the sole connection of said two windings to said output lead,
  a controlled rectifier connected between the third winding and the output lead, and
  adjustable means to adjust the conduction of the controlled rectifier and thereby adjusting the output voltage impressed on said output lead.

2. In a three phase half wave direct current power source,
  a three phase transformer having a three phase secondary with a pair of low voltage windings and one high voltage winding having a peak output voltage substantially in excess of each of the other low voltage windings,
  diode type rectifier means, a single one of said rectifier means being connected between the low voltage windings and an output lead, and constituting the sole connection therebetween,
  a gate controlled rectifier connected between the high voltage winding and the output lead, and
  a timing circuit phased with the high voltage winding and connected to actuate the gate controlled rectifier and including adjustable means to adjust the actuation of the rectifier and thereby adjusting the output voltage impressed on said output lead.

3. The power source of claim 2 having an adjustable inductance connected in series with at least one of said output leads.

References Cited
UNITED STATES PATENTS

| | | | |
|---|---|---|---|
| 3,113,259 | 12/1963 | Walker | 321—27 X |
| 3,158,734 | 11/1964 | Manz | 319—131 |
| 3,231,711 | 1/1966 | Gibson et al. | 321—10 X |

FOREIGN PATENTS

| | | |
|---|---|---|
| 191,714 | 9/1957 | Austria. |
| 1,139,593 | 11/1962 | Germany. |
| 145,954 | 6/1962 | U.S.S.R. |

JOHN F. COUCH, *Primary Examiner.*

W. H. BEHA, *Assistant Examiner.*